No. 859,846. PATENTED JULY 9, 1907.
A. F. SCHOFIELD.
HORSESHOE.
APPLICATION FILED MAR. 25, 1907.
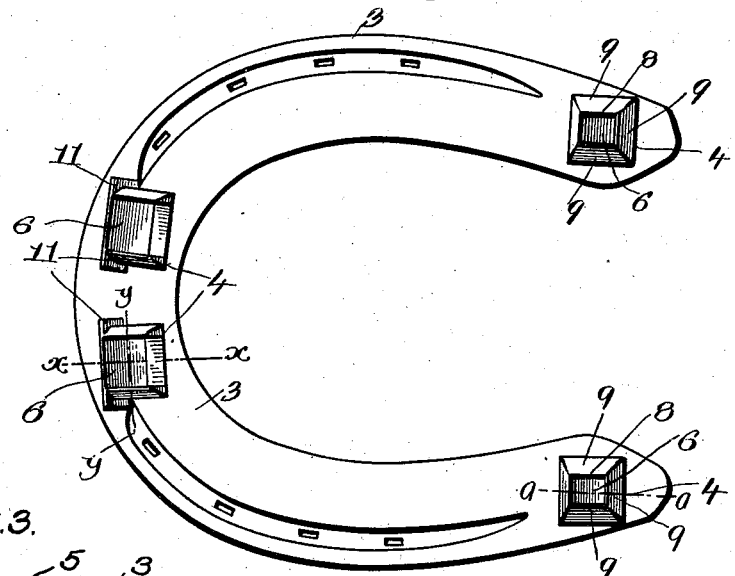
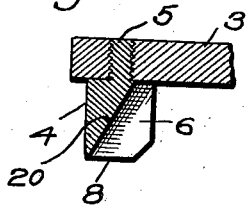
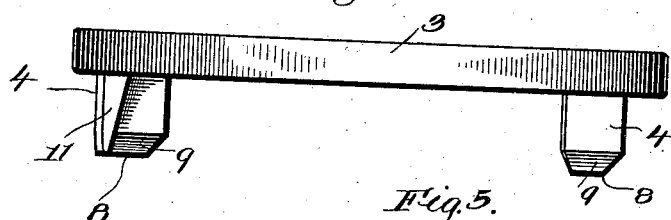
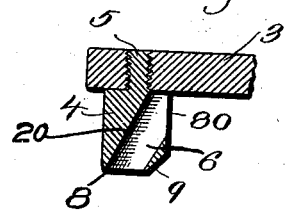
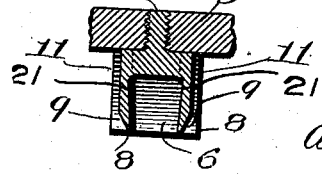
Witnesses.
W. C. Lunsford
W. L. Friary
Inventor.
Arthur F. Schofield,
by Dewsenby Gregory Attys

UNITED STATES PATENT OFFICE.

ARTHUR F. SCHOFIELD, OF STAFFORD SPRINGS, CONNECTICUT, ASSIGNOR OF ONE-HALF TO FREDERICK G. SANFORD, OF STAFFORD SPRINGS, CONNECTICUT.

HORSESHOE.

No. 859,846.        Specification of Letters Patent.        Patented July 9, 1907.

Application filed March 25, 1907. Serial No. 364,211.

*To all whom it may concern:*

Be it known that I, ARTHUR F. SCHOFIELD, a citizen of the United States, residing at Stafford Springs, county of Tolland, and State of Connecticut, have invented an Improvement in Horseshoes, of which the following description, in connection with the accompanying drawing, is a specification, like letters on the drawing representing like parts.

This invention relates to horseshoes, and particularly to the calks thereof, and has for its object to provide a novel horseshoe calk of the detachable type which will be self-sharpening and which will afford the horse a sure footing on icy roads.

The calk is preferably made hollow, and the bore thereof extends from the lower end of the calk upwardly in an inclined direction to the rear side of the calk. The rear side of the calk may be open if desired. A calk made in this way presents a sharp edge on the front and sides at its lower end and therefore a cutting edge of much greater extent than is found in an ordinary calk.

Figure 1 is a bottom view of a horseshoe showing calks embodying my invention; Fig. 2 is a side view thereof; Fig. 3 is a section on the line $x-x$, Fig. 1; Fig. 4 is a section on the line $y-y$, Fig. 1; Fig. 5 is a section on the line $a-a$, Fig. 1.

3 designates the horseshoe which may be of any suitable construction. The calks which are designated generally by 4 are of the detachable type and may be provided with screw-threaded stems 5 which are adapted to be screw-threaded into the horseshoe 3. Each calk is hollow and is provided with the interior chamber 6 which extends from the lower end of the calk backwardly at an inclination.

In the drawings I have shown two embodiments of my invention, one wherein the calk is open on the back side so that the rear end thereof presents cutting edges on three sides only, and one in which the calk is closed on all sides so that the rear edge thereof presents a square or annular cutting edge.

In the embodiment shown in Fig. 3 and in the calks at the toe of the shoe in Fig. 1, the calk is open at its rear side and the front wall 20 of the chamber 6 in the calk inclines rearwardly, as shown best in Fig. 3, while the side walls 21 are substantially perpendicular or if desired incline outwardly slightly, as shown in Fig. 4. In this embodiment of the invention the sides of the calk are shown as beveled, as at 9, and a calk thus made presents a sharp edge 8 on three sides thereof. The shape of the chamber 6 is such that the calk will not become clogged with dirt, pebbles or foreign matter because since the walls 21 flare outwardly slightly, the chamber has a larger cross sectional area at its upper end than at its lower end, and any foreign matter will thus be readily dislodged.

In another embodiment of my invention the calk is closed on all sides at its lower end, as shown in Fig. 5, and in this case the chamber 6 is open only at the bottom of the calk and at the rear side thereof near the top of the calk, as shown at 80 in Fig. 5. The rear and sides of the calk are beveled, as shown at 9, and the calk thus presents a four-sided sharp edge 8 at its lower end. In this form of the invention too the bore or chamber 6 is preferably slightly larger at its upper end than at its lower end, so that any foreign matter which enters the lower end thereof will readily work its way out at the top.

The calks may if desired have the laterally-projecting flanges 11, as shown in the calks at the toe of the shoe in the drawings, said flanges serving to strengthen and stiffen the calk and also to add to the extent of the sharpened edges thereof. It is especially advantageous to use such flanges on the calks at the front of the shoe, because they increase the wearing surface at the point where the most wear occurs.

While I have herein shown the calks as substantially square or substantially rectangular in horizontal cross section, such shape is not essential to the invention.

The drawing illustrates two embodiments only of the invention and I have not attempted to show herein any other embodiments thereof.

Having fully described my invention, what I claim as new and desire to secure by Letters Patent is:—

A horseshoe calk having a slot extending from its lower end upwardly and rearwardly and terminating at the rear side of the calk, the sides of the calk at its lower end being beveled to form a sharp cutting edge, said calk having laterally-projecting flanges at its front side.

In testimony whereof, I have signed my name to this specification, in the presence of two subscribing witnesses.

ARTHUR F. SCHOFIELD.

Witnesses:
F. G. SANFORD,
H. R. WIGHTMAN.